(12) United States Patent
Greenberger et al.

(10) Patent No.: US 10,706,312 B2
(45) Date of Patent: Jul. 7, 2020

(54) AUTOMATED FILTERING OF ITEM COMMENTS

(71) Applicant: INTERNATIONAL BUSINESS MACHINES CORPORATION, Armonk, NY (US)

(72) Inventors: Jeremy A. Greenberger, Raleigh, NC (US); Zachary M. Greenberger, Raleigh, NC (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/409,988

(22) Filed: May 13, 2019

(65) Prior Publication Data

US 2019/0266426 A1 Aug. 29, 2019

Related U.S. Application Data

(63) Continuation of application No. 15/228,271, filed on Aug. 4, 2016, now Pat. No. 10,339,404.

(51) Int. Cl.
| | |
|---|---|
| *G06F 3/048* | (2013.01) |
| *G06K 9/18* | (2006.01) |
| *H04L 12/58* | (2006.01) |
| *G06T 7/11* | (2017.01) |
| *G06F 16/58* | (2019.01) |

(52) U.S. Cl.
CPC ............. *G06K 9/18* (2013.01); *G06F 16/58* (2019.01); *G06T 7/11* (2017.01); *H04L 51/32* (2013.01)

(58) Field of Classification Search
CPC ..... G06K 9/18; H04L 51/32; G06F 17/30265; G06F 3/048; G06T 7/0081
See application file for complete search history.

(56) References Cited

U.S. PATENT DOCUMENTS

| | | | |
|---|---|---|---|
| 7,694,885 | B1 | 4/2010 | Bourdev |
| 8,495,489 | B1 | 7/2013 | Everingham |
| (Continued) | | | |

OTHER PUBLICATIONS

Peter Mell et al, The NIST Definition of Cloud Computing, National Institute of Standards and Technology, Publication 800-145, 2011, entire document.

(Continued)

*Primary Examiner* — Jeanette J Parker
(74) *Attorney, Agent, or Firm* — Patrick J. Daugherty; Daugherty & Del Zoppo Co. LPA (57) ABSTRACT

Aspects analyze published items to identify and distinguish a graphic image content or text string content element from other elements within the content of the published item, wherein the item is published with user comments. In response to a selection of the distinguished element, metadata and text content of the comments are analyzed to identify associations to the selected element. Aspects differentially display a subset of the comments in association with the published item, relative to display of remaining others of the comments, in response to determining that the analyzed metadata or analyzed text content of the subset of comments is associated with the selected element, and that the analyzed metadata or analyzed text content of the remaining others of the comments is not associated with the selected element.

20 Claims, 5 Drawing Sheets

(56) References Cited

U.S. PATENT DOCUMENTS

| | | | |
|---|---|---|---|
| 8,676,273 B1 | 3/2014 | Fujisaki | |
| 9,195,679 B1 | 11/2015 | Svendsen | |
| 9,245,288 B1 | 1/2016 | Lee | |
| 9,367,609 B1 | 6/2016 | Mianji | |
| 9,817,634 B2 | 11/2017 | Gupta | |
| 10,121,171 B1* | 11/2018 | Chang | G06Q 30/0282 |
| 2009/0251440 A1 | 10/2009 | Edgecomb | |
| 2013/0151611 A1* | 6/2013 | Graham | G06Q 50/01 |
| | | | 709/204 |
| 2014/0279039 A1* | 9/2014 | Systrom | G06Q 50/01 |
| | | | 705/14.66 |
| 2015/0347824 A1 | 12/2015 | Saari et al. | |
| 2016/0019026 A1 | 1/2016 | Gupta | |
| 2016/0085865 A1* | 3/2016 | Weingarten | G06F 16/58 |
| | | | 707/728 |
| 2016/0112360 A1* | 4/2016 | Brunn | G06F 16/248 |
| | | | 709/204 |
| 2016/0124702 A1 | 5/2016 | Edgecomb | |
| 2016/0314519 A1* | 10/2016 | Liu | G06Q 30/0641 |
| 2017/0249674 A1* | 8/2017 | Kerger | G06Q 30/0276 |
| 2017/0262869 A1 | 9/2017 | Jalali | |
| 2018/0018144 A1* | 1/2018 | Morris | G06F 16/50 |

OTHER PUBLICATIONS

Justin Kahn, Google engineers make major advancement in automatic object recognition, TechSpot, Inc., http://www.techspot.com/news, 2016, entire document.

Guest, 10 Best Ways to Comment on Facebook Photos, http://www.adweek.com/socialtimes/author/guest, 2011, entire document.

Joseph Keller, Facebook Messenger adding facial recognition for easier photo sharing [Priv], http://crackberry.com/facebook, 2015, entire document.

Jon Fingas, Google's latest object recognition tech can spot everything in your living room, http://www.engadget.com, 2014.

U.S. Appl. No. 15/228,271, filed Aug. 4, 2016—Confirmation No. 7711.

* cited by examiner

AUTOMATED FILTERING OF ITEM COMMENTS

BACKGROUND

Social networking services facilitate the development of online social networks by connecting a user's profile with those of other individuals and/or groups, and comprehend a variety of media, network and site infrastructures. Social networking services typically enable users to engage in dialogues through commentary applications associated with a user item posting, such as a photograph or still image, video and audio media content, web link citations, etc. Depending on the social media platform deployed, users as members may be able to directly contact and engage in communications with any other member.

Often data item postings are selectively shared with other users via permissions based on a recognized relationship to the user, such as a friend, business colleague, school mate, family member, etc. A given posted item may generate a wide variety of comments from a wide variety of users of the social networking service. Often a user is identified in or as otherwise associated with an uploaded image or items by "tagging" or other metadata entries that identify the user and result in notification to the user of the posting and addition of the item to activity data of the user on the social networking services. Thus notified, the user may freely review and peruse comments posted by other users and associated with the posted item.

BRIEF SUMMARY

In one aspect of the present invention, a method for automated filtering of comments associated with a published item element includes analyzing an item published to an account of a user of a social network service to identify and distinguish an element from other elements within the content of the published item. The distinguished element is graphic image content or text string content, and the item is published with a plurality of comments that are posted by a plurality of users of the social network service that is inclusive of the user. In response to a selection of the distinguished element of the item content, metadata and text content of the comments are analyzed to identify associations to the selected element. Thus, aspects differentially display a subset of the comments in association with the published item, relative to display of remaining others of the comments, in response to determining that the analyzed metadata or analyzed text content of the subset of comments is associated with the selected element, and that the analyzed metadata or analyzed text content of the remaining others of the comments is not associated with the selected element.

In another aspect, a system has a hardware processor in circuit communication with a computer readable memory and a computer-readable storage medium having program instructions stored thereon. The processor executes the program instructions stored on the computer-readable storage medium via the computer readable memory and thereby analyze an item published to an account of a user of a social network service to identify and distinguish an element from other elements within the content of the published item. The distinguished element is graphic image content or text string content, and the item is published with a plurality of comments that are posted by a plurality of users of the social network service that is inclusive of the user. In response to a selection of the distinguished element of the item content, metadata and text content of the comments are analyzed to identify associations to the selected element. Thus, aspects differentially display a subset of the comments in association with the published item, relative to display of remaining others of the comments, in response to determining that the analyzed metadata or analyzed text content of the subset of comments is associated with the selected element, and that the analyzed metadata or analyzed text content of the remaining others of the comments is not associated with the selected element.

In another aspect, a computer program product for automated filtering of comments associated with a published item element has a computer-readable storage medium with computer readable program code embodied therewith. The computer readable hardware medium is not a transitory signal per se. The computer readable program code includes instructions for execution which cause the processor to analyze an item published to an account of a user of a social network service to identify and distinguish an element from other elements within the content of the published item. The distinguished element is graphic image content or text string content, and the item is published with a plurality of comments that are posted by a plurality of users of the social network service that is inclusive of the user. In response to a selection of the distinguished element of the item content, metadata and text content of the comments are analyzed to identify associations to the selected element. Thus, aspects differentially display a subset of the comments in association with the published item, relative to display of remaining others of the comments, in response to determining that the analyzed metadata or analyzed text content of the subset of comments is associated with the selected element, and that the analyzed metadata or analyzed text content of the remaining others of the comments is not associated with the selected element.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
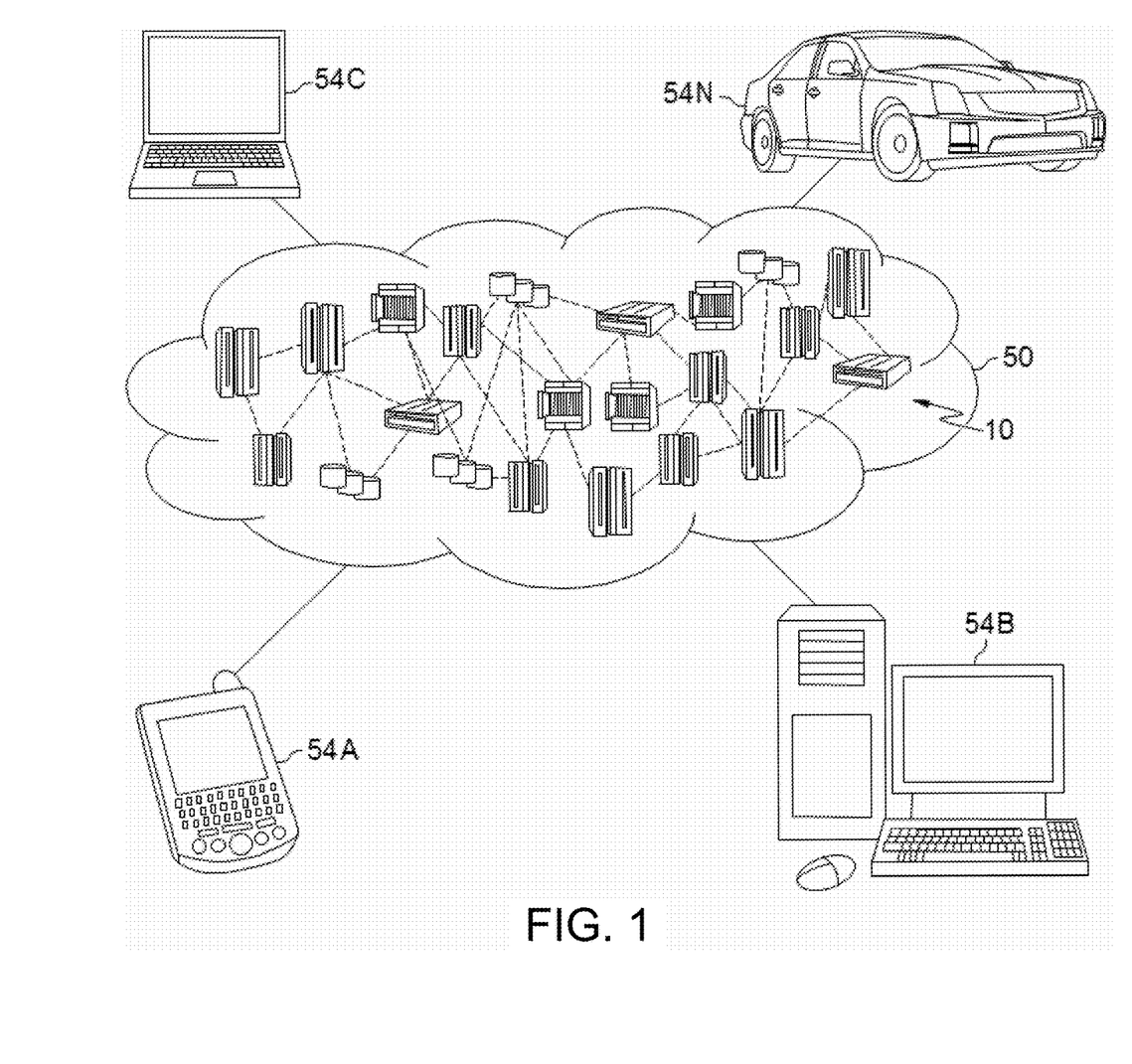
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
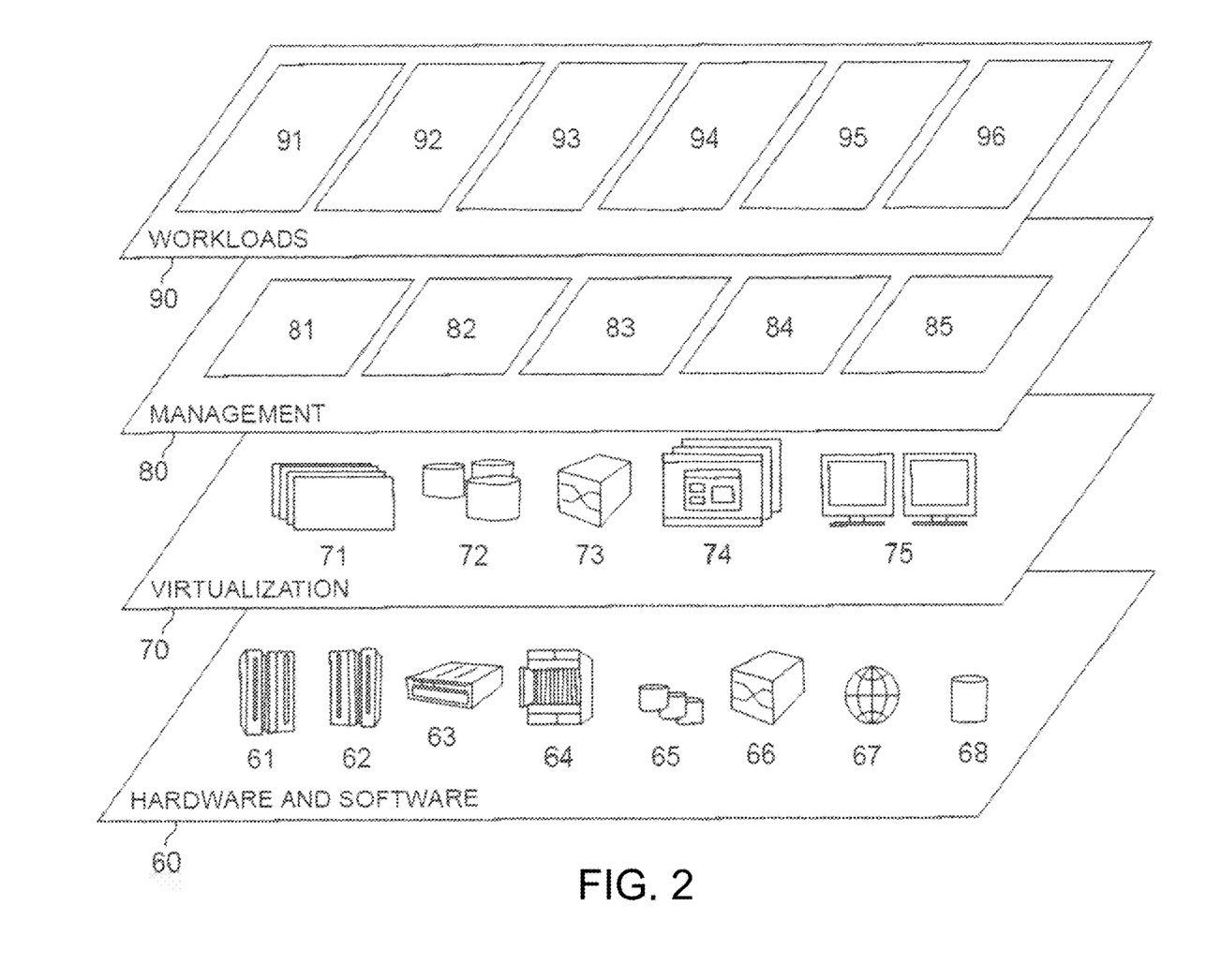
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
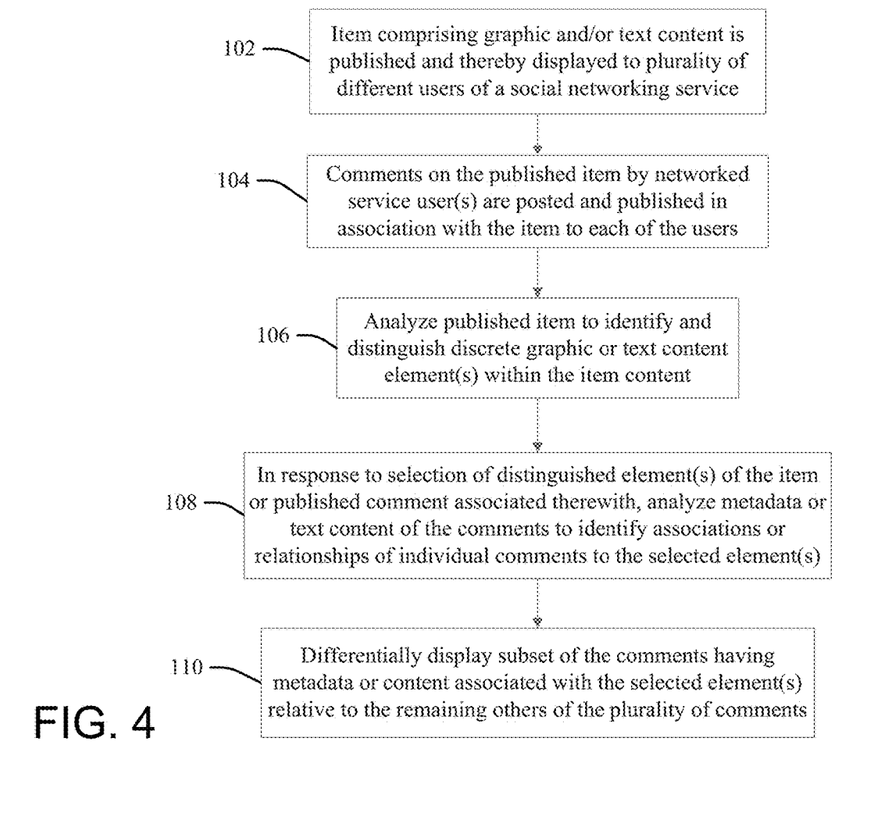
FIG. 4 is a flow chart illustration of a process or system for automated filtering of comments associated with a social networking service item posting according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 according to embodiments for automated filtering of comments associated with an item as depicted in FIG. 4 and described below.

Figure 3:
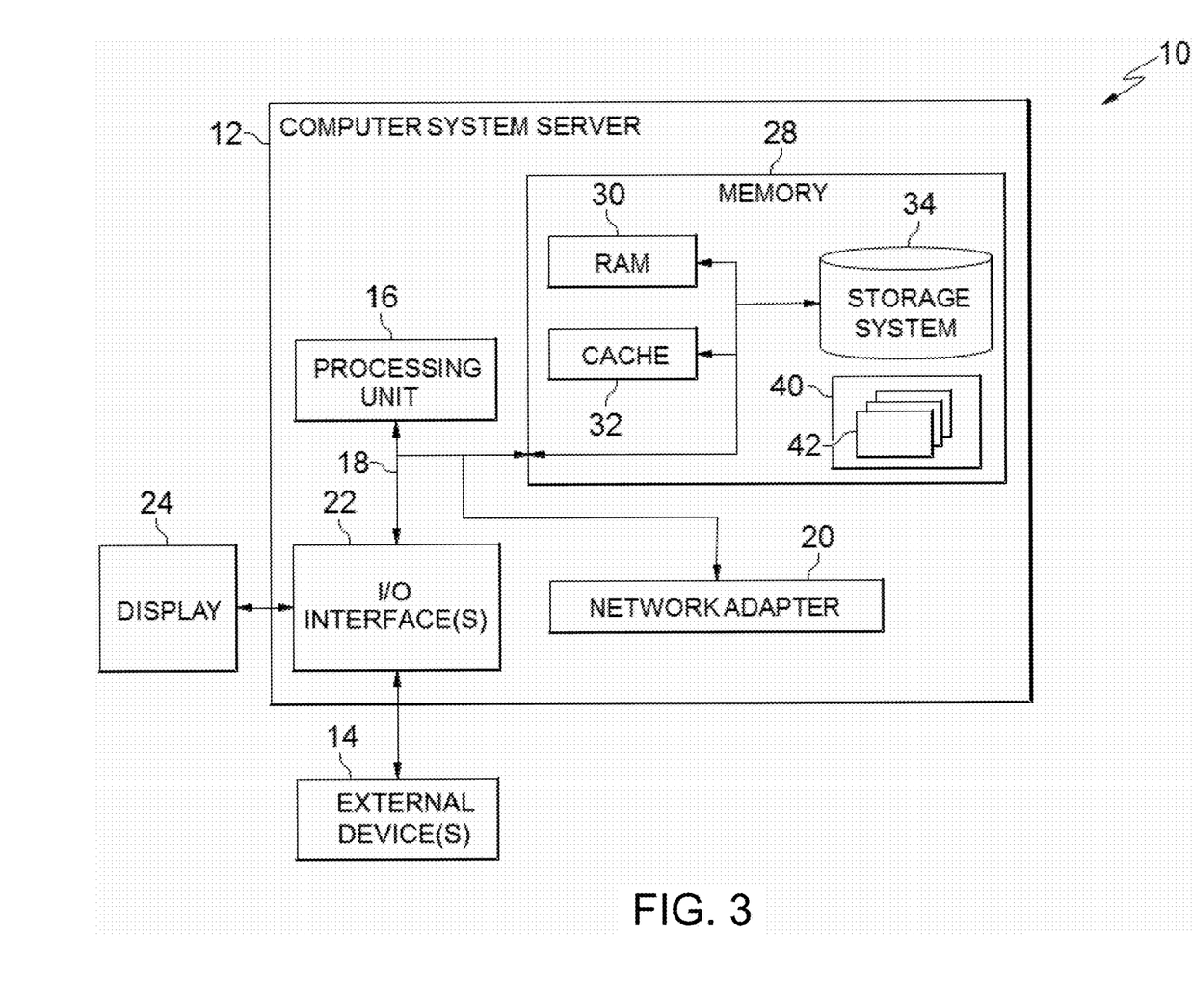
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for automated filtering of comments associated with an item. At 102 an item comprising graphic and/or text content is published and thereby displayed to plurality of different users of a social networking service, for example, via news feeds or other publication applications that are accessible by, published to, or associated with each of the users. The published item comprehends one or more of photographic image, graphic illustration, and video segment image data, and text content items, including pictures, news articles, blogs, bulletin board postings, etc.

The item is generally published in response to an upload or posting to an account application of one of the users having access to the publishing application, wherein it is automatically shared with the other users as a function of linking relationships of the users defined by the social networking service. Illustrative but not limiting or exhaustive examples of linking relationships defined within social networking services include friends, relatives, business colleagues, referral network members, school classmates, etc. Social networking services comprehen a variety of networked resources, including social media applications, shared storage devices and systems, interactive web pages or document, and company bulletin board services, and still others will be apparent to one skilled in the art.

At 104 a plurality of comments on the published item by one or more of the plurality of networked service users are posted and published in association with the item to each of the users, for example within a separate comment window, widget or application that is associated with a display of the published item. Generally the comments are published in a list that is sorted by time of posting, user identity of the commenter, or other sorting criteria. Thus a first of the users may browse the entire list of comments via a comment window display. In the case of a large plurality of comments that cannot fit within one window view, the first user may typically manually scroll through the list using a graphic user interface (GUI) inputs to scroll bars, roller widgets or other interactive GUI configurations, as will be appreciated by one skilled in the art.

At 106 an image analysis application executing on a processing unit analyzes the published item to identify and distinguish one or more discrete graphic or text content elements within content of the item. Content elements include different displayed image elements that are distinguishable from other visible elements or image data displayed within the publication of the item to the users on a graphic display device of a smart phone, computer device, etc. With respect to graphic items distinguishing elements includes distinguishing between different visual elements, such as between different people visible in a picture wherein one or more of the visible people are identified as within the plurality of users, as well as distinguishing object elements from general, contextual visual image data, such as from surrounding pixel data defining background or foreground elements of the image item (sky, water, walls, forest, grass, floors, etc.). Different element may also be recognized via metadata of the item, for example where people as discrete visual elements are tagged with identification data by users viewing the published graphic items.

At 108, in response to a selection of one (or more) of the distinguished elements of the item, or of one of the published comments associated therewith, a text analysis application executing on a processing unit cognitively and contextually analyzes metadata and text content of the comments to identify associations or relationships of individual ones of the comments to the selected element(s). The selection at 108 may be a manual selection by a viewing user, such as a mouse or touch screen or other GUI selection procedure; or it may be performed automatically by processes of the aspect, for example in response to user preferences or selection history, etc.

At 110 a subset of the plurality of comments that are each identified at 108 as having metadata or content associated with (or related to) the selected element(s) are differentially displayed to the first user relative to the remaining others of the plurality of comments (those not identified as having metadata or content associated with/related to the selected element(s)). Thus, a listed plurality of all comments published with respect to a posting of a given item is automatically filtered to differentially highlight, or display only the comments that are determined to have metadata or content relevant to or associated with the relevant elements of the selected item content or comments.

Figure 5:
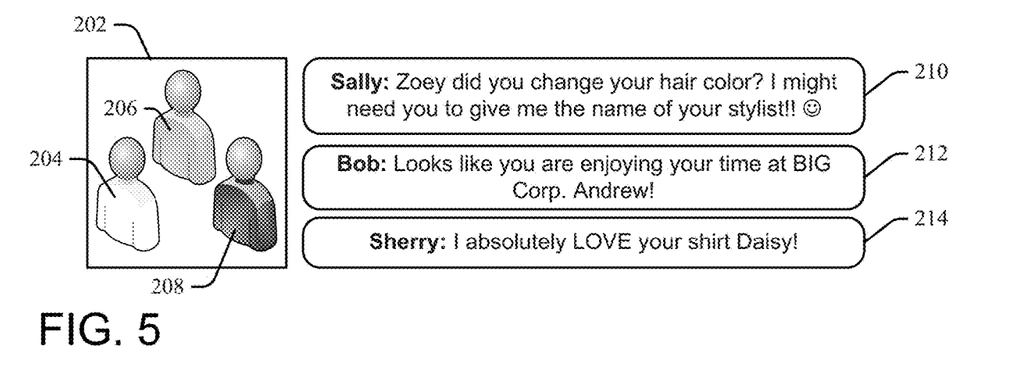
FIG. 5 is a graphic illustration of a publication of a social networking service item with associated commentary according to the present invention.

FIG. 5 illustrates an example wherein the item published (at 102, FIG. 4) is a photograph 202 of a group of related users "Daisy" 204, "Andrew" 206 and "Zoey" 208 of a social network that share views of the published item 202 and comments 210, 212 and 214 associated therewith. The users 204, 206 and 208 are identified as different and visually distinct people or user elements visible within the image data of the photograph 202 (at 106, FIG. 4), via image analysis or metadata tags processes, etc.

The comments 210, 212 and 214 displayed in FIG. 5 in association with the photograph 202 are posted and published (at 104, FIG. 4) by users related to one or more of "Daisy" 204, "Andrew" 206 and "Zoey" 208 via a social network application. The comments are each posted by different respective users that are identified in boldface with colon set-off relative to text content within the respective comments: thus, comment 210 is posted by a user named or identified as "Sally", comment 212 by "Bob" and comment 214 by "Sherry."

Figure 6:
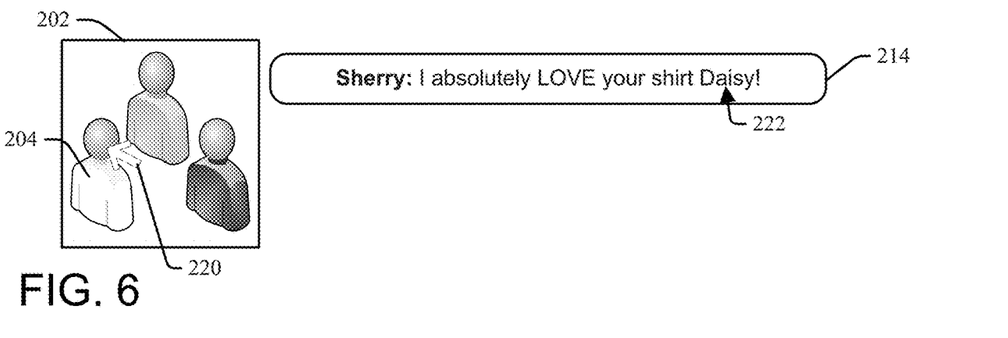
FIG. 6 is a graphic illustration of another publication of a social networking service item with associated commentary according to the present invention.

FIG. 6 illustrates an example of application of processes and devices according to the present invention, wherein the image of Daisy 204 published in the view of FIG. 5 is selected by a GUI cursor selection 220 (at 108, FIG. 4) as a selected image item element. It will be appreciated that this is a non-limiting example, and that items may be selected through a variety of GUI routines, including a touch screen selection input or voice command input from a user.

In response to the selection, text analysis of the text within the comments 210, 212 and 214 identifies (at 110, FIG. 4) the comments that have text content including the name of the selected person, "Daisy," and republishes a filtered list of the comments that includes only those comments, deleting those without "Daisy" within their content. Accordingly, comment 214 is published in FIG. 6 in response to including a "Daisy" text string 222, while comments 210 and 212 are deleted relative to the original view of FIG. 5.

In other examples filtering the comments does not delete the other, non-related or otherwise unselected comments, but instead displays them differentially, such as fading them out; diminishing font size, overall display size, brightness, focus and/or sharpness of the remainder others relative to the comments associated with the selected element; using differential coloring, highlighting or emphasis, such as using a more natural color to highlight the comments associated with the selected element; and still other techniques will be apparent to one skilled in the art.

Figure 7:
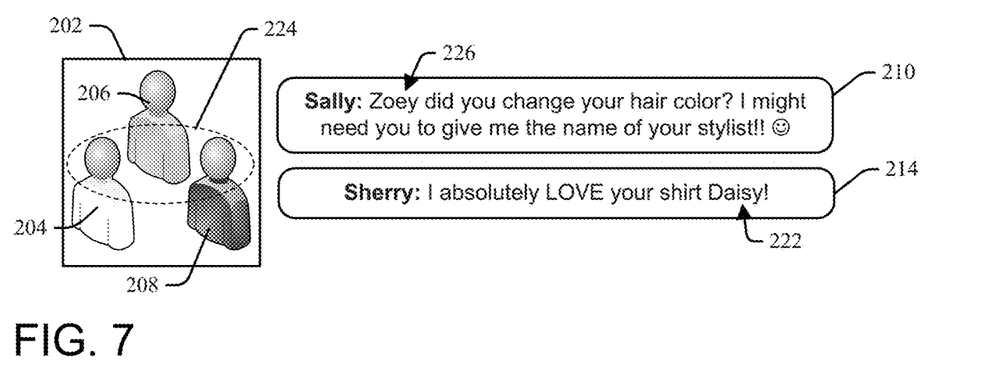
FIG. 7 is a graphic illustration of another publication of a social networking service item with associated commentary according to the present invention.

FIG. 7 illustrates another example wherein in response to a selection of two instead of the three people, Daisy 204 and Zoey 208, such as by zooming in on the image through a touch screen input or using a multi-object selection box or loop 224 with a cursor click, or another selection process, comments not including the names of either of the two, selected people are dropped from the presented list of comments. Thus, in FIG. 7 comments 210 and 214 are published in response to including text string content with respect to either one of the two, interrelated objects: comment 214 in response to determining the presence of the "Daisy" text string 222, and comment 210 is published in response to including the "Zoey" text string 226, and wherein comment 212 is deleted relative to the original view of FIG. 5.

Identifying selected image elements and their relationships to ones of the comments may be accomplished by a variety of techniques. Examples may apply facial recognition processes to the image data to identify the names of users or other persons depicted within the image data photos, or recognizing or decoding tagging or other metadata associated with the image data that identifies the person in photo data, wherein the associated comments are selected in response to including references to the identified names, or determining that said users uploaded the image data.

Identifying selected image elements used to filter the comments also comprehends other objects visible within the published image data item, independently or linked to (in combination with) one or more people or users identified in the published image data item; or considered in combination when both appear in the text content of a selected comment. For example, selection of shirt worn by person in photographic data of the published image data, or of a comment including the text term "shirt," may result in filtering the comments to publish only those referring to a shirt.

Figure 8:
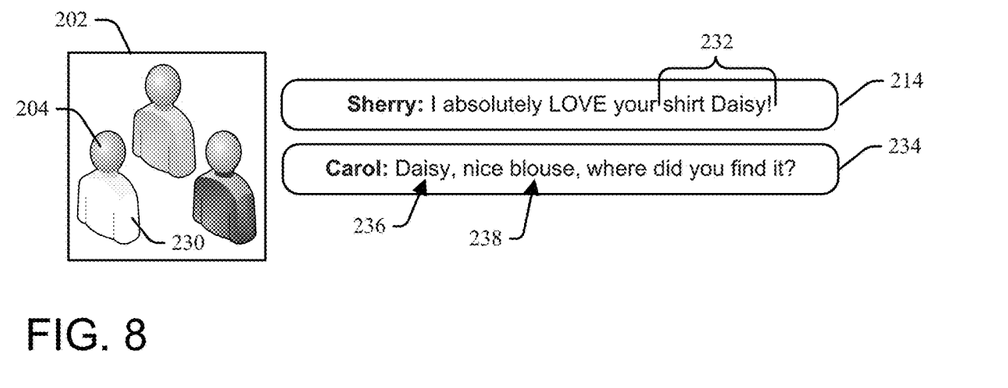
FIG. 8 is a graphic illustration of another publication of a social networking service item with associated commentary according to the present invention.

Attributes of the object may also be considered in combination to distinguish and identify comments. As shown in the example of FIG. 8, with respect to selection of a yellow shirt 230 worn by Daisy 204 within the image data, or of the comment 214 that includes a string 232 of both of the terms "shirt" and "Daisy," comments are filtered to differentially display only those comments that have both string term (or their equivalent terms) within their text content: in this example, comments 210 and 212 are again deleted relative to those regarding both the identified person and selected object. Comment 214 remains in response to having the text string "shirt Daisy" 232. New comment 234 is chosen from a universal list of all comments associated with the image item 202, in response to having the text string or term "Daisy" 236, and the string or term "blouse" 238, which is recognized as an equivalent term for the selected shirt 230 element.

Thus, comments may be filtered to include those having identification of both as text content (for example, " . . . shirt Daisy"), or an object element may be distinguished from other similar object elements, such as having text content including "yellow" and "shirt", but excluding other comments that associated different colors with a shirt, such as "red shirt," etc.

General or generic comments regarding the person or other selected object or a type or category thereof may also be used for comment selection. For example text content with regard to generic clothing or apparel issues that do not match the literal names of the selected object elements ("Nice outfit Daisy," "You look ready for that pre-trial hearing today Daisy," etc.) may be selected for publication by matching the categories of the second object (shirt) in combination with the identification of the first distinguish object ("Daisy"), wherein appearance, apparel or clothing attributes are recognized as generic categories inclusive of the shirt object and are therefore used as filtering criteria.

Visual attributes of a person selected within the published image data item may also be used to filter the comments, wherein selection of the person causes a search of or for comments of the visual attribute as well, individually or in combination with the person, whether the particular attribute is selected or not. For example, image analytics may identify features of the selected person including hair color or style, a bruise, a black-eye, a tattoo, mole, eye glasses, visible scar, jewelry, cast, eye patch, article of clothing (hat, scarf), etc. In response to determining that "Daisy" has a visible mole, the comments may be filtered to include any that have text content inclusive of "mole," "beauty mark" or other related term, individually or in combination with "Daisy."

Processes according to the present invention may be automatically performed prior to selection of an image element or specific comment, such as immediately upon (in response to) the uploading of a new photo that includes tagged (metadata-identified) depictions of users, and wherein comments may be dynamically associated with image elements as they are posted via textual analysis that searches for hits on identified image elements.

Scope of comment filtering may also be a function of relationship status of the viewing user or of the a selected user, for example to list only comments from users designated as friends that include text content regarding appearance or apparel comments relative to selection of the shirt, including as worn by "Daisy." The viewing user may also specify filtering criteria, for example choosing to see only comments from business associates on the networked service regarding apparel and/or "Daisy."

Aspects may also customize, prioritize or learn filtering attributes for selection and application relative to a specific user, group of users or global historic data. In one example a person, object or attribute is identified based on the projected tastes, likes or preferences of a viewing user, of a group of users inclusive of the viewing user (for example, all friends or relatives of business colleagues of the user), of all user of the networked service, or of some other group relevant to the user (of opinion data of professionals associated with an employment demographic of the user, etc.). For example, in response to a determination that a first of the users typically likes or wears dark clothing that is looser fitting, and the first user makes comment that she likes a shirt in a published photo, an aspect according to the present invention considers this user preference in determining which shirt the comment is likely or probably referencing if more than one shirt is present in the photo (for example, defaulting to associate the comment with one shift that is darker and looser fitting relative to another shirt in the photograph.

Aspects may also automatically filter comments directed to other media content. For example, with respect to a user reading a blog or news article, in response to recognizing a historic preferences of the user for reading comments regarding a certain movie or author titles or genres, an aspect of the present invention may automatically filter comments on the blog or news article to prioritize or list only those comments having phrase, quotes or other content associated with or relevant to the preferred content items or categories.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated filtering of comments associated with a published item element, comprising executing on a computer processor the steps of:
    analyzing via image analysis a photograph item that is published to an account of a user of a social network service to
    identify and distinguish an element that is an image of an object that is visible within the photograph item from other elements that are visible within graphic content of the published photograph item and from surrounding contextual visual image pixel data,
    wherein the item is published with a plurality of comments that are posted by a plurality of users of the social network service that is inclusive of the user, and
    wherein the surrounding contextual visual image pixel data defines a background element or a foreground element;
    in response to a selection of the distinguished element and a third element of the other elements that is visually distinguished from the distinguished element within the published photograph, determining a visual attribute of one of the distinguished element and the third element;
    analyzing text content of the plurality of comments to identify associations of the analyzed text content of the plurality of comments to the selected distinguished element, the third element and determined visual attribute; and
    differentially displaying a subset of the plurality of comments to the user account of the social network in association with the published item, relative to displays of remaining others of the plurality of comments that are not within the subset,
    in response to determining that analyzed text content of the subset plurality of comments comprises a string text content identification of the determined visual attribute and the selected distinguished element and the third element, and
    that the analyzed text content of each of the remaining others of the plurality of comments does not comprise the string text content identification of the determined visual attribute and the selected distinguished element and the third element, wherein the string text content identification of the determined visual attribute is a description of an appearance feature of a person, wherein the selected distinguished element is an image of the person and the third element is the appearance feature that is visible within the image of the person.

2. The method of claim 1, wherein the step of differentially displaying the subset plurality of comments is chosen from the group consisting of, relative to a display of the subset plurality of comments:
    deleting the remaining others;
    fading out the remaining others;
    using a different a color of display; and
    diminishing an attribute of the remaining others that is selected from the group consisting of a font size, an overall display size, a brightness level, a focus level and a sharpness level.

3. The method of claim 1, further comprising:
    integrating computer-readable program code into a computer system comprising a processor, a computer readable memory in circuit communication with the processor, and a computer readable storage medium in circuit communication with the processor; and
    wherein the processor executes program code instructions stored on the computer-readable storage medium via the computer readable memory and thereby performs the steps of analyzing the photograph item published to the user account to identify and distinguish the element from the other elements visible within the graphic content of the published item and from the surrounding contextual visual image pixel data within content of the published item, determining the visual attribute, analyzing text content of the plurality of comments to identify the associations of the analyzed text content of the plurality of comments to the selected distinguished element, the third element and the determined visual attribute, and differentially displaying the subset of the plurality of comments to the user account of the social network in association with the published item relative to displays of remaining others of the plurality of comments.

4. The method of claim 3, wherein the computer-readable program code is provided as a service in a cloud environment.

5. The method of claim 1, further comprising:
    selecting the subset of the plurality of comments that are differentially displayed in response to determining that the analyzed text content of the subset plurality of comments comprises string text content that identifies the object, and wherein the identification of the object is selected from the group consisting of a name of the object, a type of the object, and a category of the object.

6. The method of claim 1, further comprising:
    distinguishing the selected element of the published photograph item from a second element that is visible within the published photograph item and within a common attribute category of the selected element, in response to a historic preference for a value of the common attribute of the selected element that is different from a value of the common attribute for the second element.

7. The method of claim 1, further comprising:
determining the visual attribute as a color of the selected distinguished element of the published item; and selecting the subset of the plurality of comments that are differentially displayed in response to determining that the analyzed text content of the subset plurality of comments comprises string text content that associates the determined color with the identification of the object.

8. The method of claim 1, wherein the selected distinguished element is an image of a first user of the plurality of users, and the third element is a second object that is associated with the first user.

9. The method of claim 8, wherein the third object is an item of apparel worn by the first user;
and wherein the subset of the plurality of comments that are differentially displayed are selected in response to determining that the analyzed text content of the subset plurality of comments comprises string text content terms that are within a general clothing category of the item of apparel worn by the first user.

10. A system, comprising:
a processor; a computer readable memory in circuit communication with the processor; and a computer readable storage medium in circuit communication with the processor; wherein the processor executes program instructions stored on the computer-readable storage medium via the computer readable memory and thereby:
analyzes via image analysis a photograph item that is published to an account of a user of a social network service to identify and distinguish an element that is an image of an object that is visible within the photograph item from other elements that are visible within graphic content of the published photograph item and from surrounding contextual visual image pixel data, wherein the item is published with a plurality of comments that are posted by a plurality of users of the social network service that is inclusive of the user, and wherein the surrounding contextual visual image pixel data defines a background element or a foreground element;
in response to a selection of the distinguished element, and a third element of the other elements that is visually distinguished from the distinguished element within the published photograph, determines a visual attribute of one of the distinguished element and the third element;
analyzes text content of the plurality of comments to identify associations of the analyzed text content of the plurality of comments to the selected distinguished element, the third element and the determined visual attribute;
differentially displays a subset of the plurality of comments to the user account of the social network in association with the published item, relative to displays of remaining others of the plurality of comments that are not within the subset,
in response to determining that analyzed text content of the subset plurality of comments comprises string text content associated with identification of the determined visual attribute and the selected distinguished element and the third element,
and that the analyzed text content of each of the remaining others of the plurality of comments does not comprise the string text content identification of the determined visual attribute and the selected distinguished element and the third element, wherein the string text content identification of the determined visual attribute is a description of an appearance feature of a person, wherein the selected distinguished element is an image of the person and the third element is the appearance feature that is visible within the image of the person.

11. The system of claim 10, wherein the processor executes the program instructions stored on the computer-readable storage medium via the computer readable memory and thereby:
selects the subset of the plurality of comments that are differentially displayed in response to determining that the analyzed text content of the subset plurality of comments comprises string text content that identifies the object, and wherein the identification of the object is selected from the group consisting of a name of the object, a type of the object, and a category of the object.

12. The system of claim 10, wherein the processor executes the program instructions stored on the computer-readable storage medium via the computer readable memory and thereby:
distinguishes the selected element of the published photograph item from a second element that is visible within the published photograph item and within a common attribute category of the selected element, in response to a historic preference for a value of the common attribute of the selected element that is different from a value of the common attribute for the second element.

13. The system of claim 10, wherein the processor executes the program instructions stored on the computer-readable storage medium via the computer readable memory and thereby:
determines the visual attribute as a color of the selected distinguished element of the published item; selects the subset of the plurality of comments that are differentially displayed in response to determining that the analyzed text content of the subset plurality of comments comprises string text content that associates the determined color with the identification of the object.

14. The system of claim 10, wherein the selected distinguished element is an image of a first user of the plurality of users, and the third element is a second object that is associated with the first user.

15. The system of claim 14, wherein the third object is an item of apparel worn by the first user;
and wherein the processor executes the program instructions stored on the computer-readable storage medium via the computer readable memory and thereby selects the subset of the plurality of comments that are differentially displayed in response to determining that the analyzed text content of the subset plurality of comments comprises string text content terms that are within a general clothing category of the item of apparel worn by the first user.

16. A computer program product for automated filtering of comments associated with a published item element, the computer program product comprising: a computer readable storage medium having computer readable program code embodied therewith, wherein the computer readable storage medium is not a transitory signal per se, the computer readable program code comprising instructions for execution by a processor that cause the processor to:
analyze via image analysis a photograph item that is published to an account of a user of a social network service to identify and distinguish an element that is an image of an object that is visible within the photograph item from other elements that are visible within graphic content of the published photograph item and from surrounding contextual visual image pixel data, wherein the item is published with a plurality of comments that are posted by a plurality of users of the social network service that is inclusive of the user, and wherein the surrounding contextual visual image pixel data defines a background element or a foreground element;

in response to a selection of the distinguished element and a third element of the other elements that is visually distinguished from the distinguished element within the published photograph, determining a visual attribute of one of the distinguished element and the third element;

analyze text content of the plurality of comments to identify associations of the analyzed text content of the plurality of comments to the selected distinguished element, the third element and the determined visual attribute; and differentially display a subset of the plurality of comments to the user account of the social network in association with the published item, relative to displays of remaining others of the plurality of comments that are not within the subset, in response to determining that analyzed text content of the subset plurality of comments comprises string text content associated with identification of the determined visual attribute and of the selected distinguished element and the third element, and that the analyzed text content of each of the remaining others of the plurality of comments does not comprise the string text content identification of the determined visual attribute and the selected distinguished element and the third element, wherein the string text content identification of the determined visual attribute is a description of an appearance feature of a person, wherein the selected distinguished element is an image of the person and the third element is the appearance feature that is visible within the image of the person.

17. The computer program product of claim 16, wherein the computer readable program code instructions for execution by the processor further cause the processor to:
select the subset of the plurality of comments that are differentially displayed in response to determining that the analyzed text content of the subset plurality of comments comprises string text content that identifies the object, and wherein the identification of the object is selected from the group consisting of a name of the object, a type of the object, and a category of the object.

18. The computer program product of claim 16, wherein the computer readable program code instructions for execution by the processor further cause the processor to:
distinguish the selected element of the published photograph item from a second element that is visible within the published photograph item and within a common attribute category of the selected element, in response to a historic preference for a value of the common attribute of the selected element that is different from a value of the common attribute for the second element.

19. The computer program product of claim 16, wherein the computer readable program code instructions for execution by the processor further cause the processor to:
determine the visual attribute as a color of the selected distinguished element of the published item; select the subset of the plurality of comments that are differentially displayed in response to determining that the analyzed text content of the subset plurality of comments comprises string text content that associates the determined color with the identification of the object.

20. The computer program product of claim 16, wherein the selected distinguished element is an image of a first user of the plurality of users, and the third element is a second object that is an item of apparel worn by the first user;
and wherein the computer readable program code instructions for execution by the processor further cause the processor to select the subset of the plurality of comments that are differentially displayed in response to determining that the analyzed text content of the subset plurality of comments comprises string text content terms that are within a general clothing category of the item of apparel worn by the first user.

\* \* \* \* \*